(12) United States Patent
Horian

(10) Patent No.: US 8,075,971 B1
(45) Date of Patent: Dec. 13, 2011

(54) CHAIR MAT

(75) Inventor: Richard C. Horian, Corona, CA (US)

(73) Assignee: Norstar Office Products, Inc., Commerce, CA (US)

( * ) Notice: Subject to any disclaimer, the term of this patent is extended or adjusted under 35 U.S.C. 154(b) by 276 days.

(21) Appl. No.: 12/239,565

(22) Filed: Sep. 26, 2008

(51) Int. Cl.
*B32B 3/10* (2006.01)
*B32B 5/02* (2006.01)

(52) U.S. Cl. .......................................... 428/61

(58) Field of Classification Search .............. 428/61, 428/58, 55, 77
See application file for complete search history.

(56) References Cited

U.S. PATENT DOCUMENTS

| 4,387,128 | A | 6/1983 | Emms et al. ............ 428/60 |
| 4,448,625 | A | 5/1984 | Carrera .................. 156/243 |
| 4,476,174 | A | 10/1984 | Carrera .................. 428/58 |
| 4,784,888 | A | 11/1988 | Schwertner et al. ...... 428/67 |
| 5,059,476 | A | 10/1991 | Steiniger et al. ......... 428/217 |
| 5,073,428 | A | 12/1991 | Lancelot et al. ......... 428/67 |
| 6,177,165 | B1 | 1/2001 | Robbins, III et al. ..... 428/43 |
| 6,183,833 | B1 | 2/2001 | Robbins, III et al. ..... 428/80 |
| 6,284,341 | B1 | 9/2001 | Robbins, III et al. ..... 428/67 |
| 6,287,659 | B1 | 9/2001 | Robbins, III et al. ..... 428/43 |
| 6,589,631 | B1 * | 7/2003 | Suzuki et al. ............ 428/172 |
| 6,844,058 | B2 * | 1/2005 | Blum et al. .............. 428/343 |
| 2003/0219565 | A1 * | 11/2003 | Heartsfield ............. 428/56 |

FOREIGN PATENT DOCUMENTS

GB   2155854 A   * 10/1985

* cited by examiner

*Primary Examiner* — Alexander Thomas
(74) *Attorney, Agent, or Firm* — Connolly Bove Lodge & Hutz LLP

(57) ABSTRACT

A chair mat includes two first flat panels having sufficient rigidity to support a chair with a person therein. The panels have abutting straight panel edges. Flexible fabric is permanently adhered to and fully covers one side of the abutting panels. The other side of the abutting panels has an anti-skid surface provided by the panels themselves or covering material not essentially providing tensile strength across the abutting straight panel edges. A material strip extends the length of the abutting first and second straight panel edges permanently adhered to the panels between the flexible fabric sheet and the panels with high tensile strength filaments oriented laterally of the material strip.

5 Claims, 1 Drawing Sheet

CHAIR MAT

BACKGROUND OF THE INVENTION

The field of the present invention is furniture mats for supporting a chair.

Chair mats used in both office and home environments are to facilitate the ease of movement of rolling chairs placed upon them. In addition, chair mats also help to protect the carpet or other flooring surfaces underneath from the inevitable wear caused from repeated movement of the rolling chair over the surface.

There are many chair mat designs and foldable sheet mechanisms. Reference is made to U.S. Pat. Nos. 4,387,128, 4,448,625, 4,476,174, 4,784,888, 5,059,476, 5,073,428, 6,177,165, 6,183,833, 6,284,341 and 6,287,659. The predominant design in use today is a transparent plastic molded unit that usually includes a series of spikes protruding from the underside of the mat. Anyone that has tried to fit one of these difficult to roll up units into their car has likely felt the wrath of these plastic spikes against their skin. The purpose of the included molded spikes is to lock the chair mat into the carpet fibers thus holding it in place. The purpose of the mat being molded in transparent plastic is to allow the carpet or other floor covering color under the mat to show through.

The problem with these transparent molded chair mats are three fold. First, the plastic being transparent and relatively smooth does nothing to hide the inevitable black chair wheel marks, scuffs, scratches and embedded dirt. In fact, it seems to amplify them in appearance. Second, the clear plastic chair mat is relatively weak in structure by nature. Most clear chair mats are molded of rigid vinyl or polycarbonate. Neither of these plastics are actually "rigid". At the thicknesses most chair mats are molded, 0.080"-0.200, they can easily be flexed which somewhat defeats the intended purpose of facilitating a rolling chair. This causes added fatigue by the user when trying to traverse their chair over the surface. Third, again adding to the flexibility of these materials, is the problem of "chair ruts". A chair rut may be defined as a place the chair rests for long periods of time that actually stretches the plastic chair mat underneath into the formation of a groove replicating the wheel shape. These areas are highly stressed and it is usually here where the transparent plastic chair mat cracks first.

There have been many inventions including v-grooves or relief sections molded within the plastic chair mat to facilitate folding to allow easier transport for cash and carry purchases at the local office supply store. However, these hinge designs leave much to be desired within the design parameters that allow for a high quality chair mat that functions properly at a low cost. Either the hinge design leaves a weak spot, such as a "v groove" where material is absent increasing fatigue and causes a ditch for the traversing roller chair or they leave a bump and or a void creating weakness in their attachment areas.

There are many other chair mat inventions that have addressed the problems of wear, rigidity and fold ability. These include chair mats made of wood, high pressure laminates; even glass. Each have their own problems and limitations. The most glaring of all these problems is cost. What is desired is a chair mat that is foldable without spring back to allow easy transport, one that hides wheel scuffs, scratches and dirt, one that is long lasting and finally; a chair mat that is rigid and strong to allow easy rolling of the chair placed upon it.

SUMMARY OF THE INVENTION

The present invention is directed to a chair mat having at least two flat panels with sufficient rigidity to support a chair with a substantial person therein even if the mat is placed on a soft surface such as carpeting. The flat panels have abutting straight panel edges. A flexible fabric sheet is permanently adhered to and fully covers a bearing surface of each of the flat panels with the straight panel edges abutting.

Such a chair mat is easily handled in the folded state allowing it to be constructed of quite rigid material. Further, highly wear resistant but flexible material may be employed to esthetically cover the mat and at the same time allow facile folding in a first direction for easy transport and prevent folding in the opposite direction.

In a further and separate aspect of the present invention, a material strip may be employed between the flexible fabric sheet and the abutting flat panels extending the length of the abutting straight panel edges with high tensile strength filaments oriented laterally of the material strip. Such a material strip may be employed to add further strength to the mat against folding of the mat in one direction.

In yet another separate aspect of the present invention, covering material may be permanently adhered to the other side of the flat panels from the flexible fabric sheet with essentially no tensile strength across the abutting straight panel edges. This covering material may be employed to provide anti-skid or esthetic properties depending on the orientation of the mat on the floor.

Thus, it is an object of the present invention to provide an improved chair mat. Other and further objects and advantages will appear hereinafter.

DETAILED DESCRIPTION OF THE PREFERRED EMBODIMENT

Figure 1:
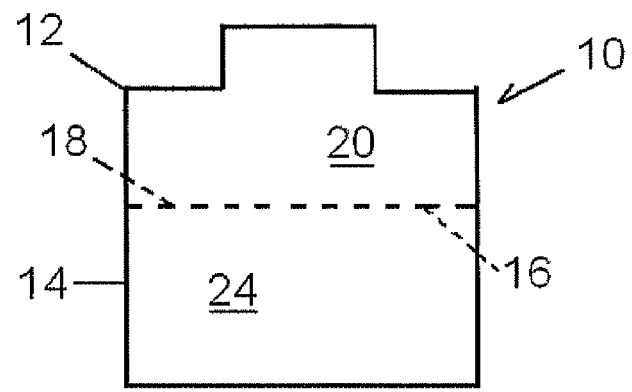
FIG. 1 is a plan view of the chair mat.
Figure 2:
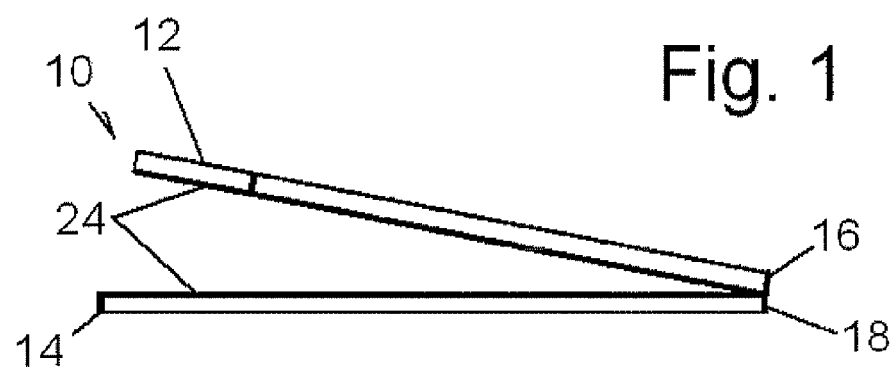
FIG. 2 is a side view of the chair mat of FIG. 1 with the mat in a partially folded state.
Figure 3:
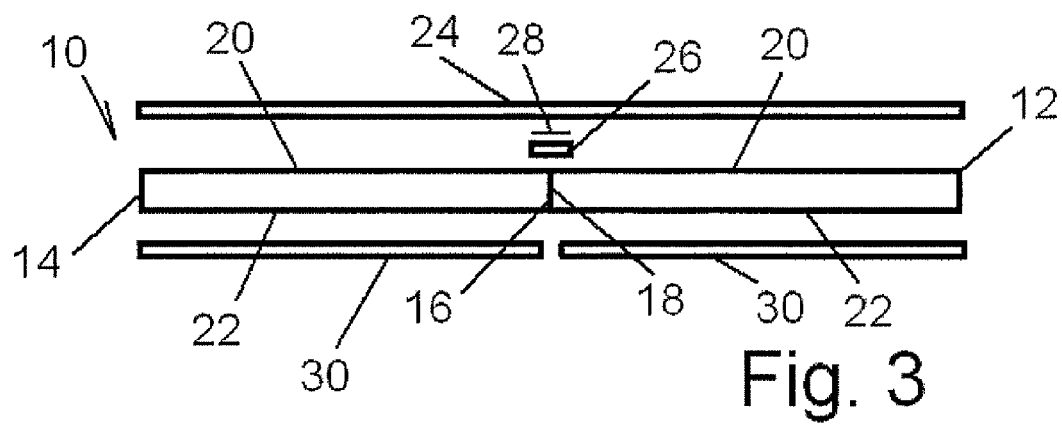
FIG. 3 is an exploded assembly side view of the mat of FIG. 1.

Turning in detail to the drawings, a chair mat, generally designated 10 is shown to include two flat panels 12, 14. FIG. 1 illustrates such a mat 10 in plan. Naturally, the mat may be any appropriate shape to fit the intended furniture. The illustrated mat 10 is shown to have a profile for placement extending under a conventional desk. Details of possible materials for the flat panels 12, 14 are discussed below. Functionally, these panels 12, 14 are intended to have sufficient rigidity to support a chair with a person therein. Such a chair would typically include three or more rollers equiangularly spaced about a common pedestal. Obviously, sliding chair supports may also be considered.

The flat panels 12, 14 each include a straight panel edge 16, 18. The straight panel edges 16, 18 are conveniently perpendicular to the plane of each respective flat panel 12, 14, conveniently are of the same length and conveniently have a width equal to the thickness of each panel 12, 14 in the preferred embodiment. The edges 16, 18 are intended to abut one another when the flat panels 12, 14 are extending in a common plane. The flat panels 12, 14 may be molded with smoother textured planar surfaces and do not require identity. Indeed, the intended bottom surface of the flat panels 12, 14 may include anti-skid surface texture including but not limited to protruding elements, cross-hatched patterns and the like. The planar surfaces of the flat panels 12, 14 are conveniently identified as chair bearing surfaces 20 and floor bearing surfaces 22. In the preferred embodiment, the hinge is arranged on the chair bearing surface 20. However, the alternative may be preferred in some instances. Thus, the application also speaks in terms of top and bottom in discussion of the preferred embodiment.

A flexible fabric sheet 24 is permanently adhered and fully covering both of the flat panels 12, 14 on the chair bearing surfaces 20. The sheet 24 is arranged on the panels 12, 14 with the panels 12, 14 abutting along the straight panel edges 16, 18. A discussion of possible fabric sheets 24 is undertaken below. The sheet 24 may be nonwoven and very thin. The presence of this flexible fabric sheet 24 allows the flat panels 12, 14 to fold over one another at the straight panel edges 16, 18 to make a very flat folded assembly. Alternatively, the flat panels 12, 14 can be arranged in the same plane with the straight panel edges 16, 18 directly abutting and the overall chair mat 10 acting as a single piece to support a chair.

Under certain circumstances, a material strip 26 may extend along the abutting straight panel edges 16, 18 and permanently adhered to the flat panels 12, 14. With the employment of the material strip 26, the flexible fabric sheet 24 is arranged over the strip 26. As discussed below, high tensile strength filaments 28 extend at least laterally across the abutting straight panel edges 16, 18.

A covering material 30 is arranged on the floor bearing surface 22. This material 30 may be divided into two panels with a break at the abutment of the panel edges 16, 18. Alternatively, the covering material 30 may extend across the abutment but lacks tensile strength to resist folding of the panels 12, 14 over one another. With either arrangement, there is preferably essentially no tensile strength across the abutting panel edges to accommodate full folding movement of the flat panels 12, 14. The material 30 may include anti-skid attributes which could include a high friction material such as rubber sheet or protruding elements, a hatched surface or the like.

The top cover fabric 24 may be any woven or non-woven flexible fabric sheet made from natural fibers, plastics, copolymers, composite weaves, laminates or woven metal mesh suitable to hide or reduce wear and allow easy chair movement over its surface. The top cover fabric 24 may be permanently adhered to the panel substrates 12, 14 by any means practical including pressure sensitive adhesive, liquid adhesive, multi-component adhesives, epoxies, hot melt adhesive, RF activated adhesive, heat fusing or any combination thereof.

Regarding a preferred embodiment, fabric material was developed for the auto industry many years ago that is now common in all vehicles. It is used in floor mats, carpets, linings, trunks and other high wear areas. Such material actually is a non-woven, punched fabric that is usually made of polypropylene or polyester resins. It has a carpet/felt like appearance, is quite attractive and is made in many colors and patterns. The material is very thin, approximately 0.030" when compressed and unbelievably strong and durable. Yet, it provides an attractive carpet like appearance for high wear traffic or abuse areas even in extreme environmental conditions.

It would seem that placing a carpet on top of a chair mat on top of a carpet would be a contradiction in terms. However, because non-woven fabrics are so thin, when tested, these durable materials provide for smooth roller chair movement. Because the material is punched, with individual material strands running in all directions, wheel marks and wear do not readily show. Thus, this material is uniquely suited for adhering to the surface of a chair mat to provide a thin, strong, smooth, mat fabric like quality that facilitates easy chair movement, hides wheel marks, scuffs and dirt and provides long lasting wear.

When conducting tests as to which hinge type should be used to make the chair mat 10 foldable, none of the hinged chair mat designs considered in the prior art known to the inventor were found acceptable. As previously noted, most hinge designs left either some type of void or gap that created a weakness in the structure of the chair mat or a bump when rolling the chair over the hinged area.

When experimenting with a two panel chair mat 10 of approximately 48" square that would fold in half to 24"×48", it was also found that many hinge design types did not allow adjacent panels to fold completely flat. It was found that if two rigid panels 12, 14 of 24"×48" were firmly butted together with a contiguous piece of 48"×48" non-woven fabric 24 firmly adhered to the surface of both panels 12, 14, a perfect hinge was formed. At the same time, there was no void between the abutted panels 12, 14 in the open position to create a stress area or void or bump that could be felt when traversing the roller chair over the seam. Most importantly, this unique top cover hinge only added to the strength of the abutted panels. All other chair mat hinge systems considered created weakness in the hinged area either by design or attachment.

With thin material 24, the two panels 12, 14 fold flat against each other in one direction for safe shipping and easy transport from store to car. In the other direction, the 48" square panel mat 10 does not fold at all as the top cover hinge prevented separation of the two butted panels. Simply, the consumer would now be able to purchase the chair mat 10 folded flat at the store and easily transport it to home or office. On location, the mat 10 could then be unfolded to its full, straight position and put into place under a desk. There is no perceivable bump or void when traversing the roller chair over the hinged area. The two panels 12, 14 remain firmly butted together using this top cover hinge system. Of all the prior patent art reviewed, no chair mat is disclosed with a permanently adhered, one piece full surface fabric 24 covering to be used as both a hinge and a protective covering that hides wear and facilitates even rolling chair movement.

Very rarely is a chair mat moved once it is in place. There are instances however when some people do move their chair mats frequently as those working in temporary office areas. Here, the solution came to use two top surface hinges. The first would be laminated over the top of the two or more adjoining butted chair mat panels 12, 14. The preferred embodiment of this hinge would be the cross hatched fiber glass reinforced material strip 26, or tape, of a thickness less than 0.040" and a width of approximately 2"-3". The reinforcing preferably includes high tensile strength filaments 28 arranged to extend laterally of the tape 26. Such lateral extension may be perpendicular to the longitudinal direction of the tape 26 or at an angle thereto with corresponding filaments 28 at the same angle to the other side of perpendicular to effect the same result. The hinge 26 is affixed to the panels across the entire length of the seam. The contiguous top cover hinge of decorative fabric 24 is permanently laminated to the entire surface area of the panels 12, 14 and top cover hinge strip 26. Still, no bump is felt or seen on the top surface of the fabric covered chair mat 10. The benefit in added strength for repeated folding is now that there are two top cover hinges in place.

The second top cover hinge strip 26 may be made of any monofilament material, fiber glass reinforced polyester tape or any combination of materials that may allow for a thin, strong top cover hinge which may be adhered to the panels by any means. Again, the reinforcing preferably includes fibers 28 arranged laterally of the tape 26. The preferred embodiment of this invention is a two panel foldable chair mat 10. However, three or more panels may be used as required or desired.

The substrate panels 12, 14 may be made of hardboard, medium density fiberboard, high density fiberboard, plywood, aluminum, plastic, fiber glass, carbon fiber or any combination thereof in a composite panel construction. Transparency is no longer an issue when selecting the material for panels 12, 14 to be used in this invention. The chair mat 10 of this embodiment is opaque. Therefore, substrate panels 12, 14 can now be selected for the greatest rigidity, strength, durability, weight and cost. There were many types of substrates tested for the chair mat rigid panels 12, 14. The preferred use ended up being "hardboard". This material has come a long way from what was referred to many years ago as Masonite®, a fiber board sheet material sold under trademark since around 1926 of the Masonite Corporation.

In fact, Georgia-Pacific Wood Products LLC currently offers a fiber board sheet product called Superwood® hardboard. This is a "wet process" hardboard with published specifications for their 3.2 mm board having the incredible properties of Flexural Strength (MOR)-ASTM D1037 (Mpa) 35-41 (psi) 5,000-6,000 Flexural Stiffness (MOE)-ASTM D1037 (Mpa) 3,100-3,800 (psi) 450,000-550,000 Tensile Strength-ASTM D 1037 (Mpa) 26 (psi) 3,800 Burst-SAE J315 (Mpa) 3.6 (psi) 520. A vinyl chair mat cannot match this.

There is an additional feature that makes "wet process" hardboard an ideal substrate for a chair mat. During the manufacturing process, fluids are separated when making the board by high compression over a stainless steel screen. This leaves a cross hatched pattern on the back side of hardboard. This cross hatch embossing actually works ideally to interlock with carpet fibers and prevents the chair mat from moving when placed on a carpeted floor. Also the material is soft enough not to scratch or mar hardwood floors that it might be placed upon.

The bottom 22 of the panels may include a cross hatched pattern, a smooth surface or be covered with an adhered second substrate laminate 30 of any kind providing there is a break or weakness in the laminate where any hinge areas may be between the butted panels. Bottom anti-skid covering material 30 may employ conventional high friction, rough texture, physical protrusions or like elements to create a friction or interlocking hold on the floor material with the intended floor surface dictating the device used. Obviously a carpeted floor would be advantaged by a different covering material 30 than a bare concrete floor. The covering material 30 may employ a break at the abutting edges of the panels 12, 14 or cover the complete underside 22 of the mat 10. In either case, the covering material 30 is to provide essentially no tensile strength across the abutting panel edges to allow folding. In the latter case, the covering material 30 is to be stretchable to allow a full radius bend to allow the chair mat 10 to assume the fully folded position.

Thus, a new chair mat 10 is disclosed with a top cover laminated fabric 24 that adds strength to the chair mat 10 and hides wheel scuffs, scratches and dirt and is sectioned with the addition of one or two top cover hinges for easy and convenient flat folded transport. Rigid, durable butted panels 12, 14 may be covered with another material 30 on the bottom to prevent floor slippage or rely on the pattern or surface design inherently included on the bottom of the panels to accomplish same.

While embodiments and applications of this invention have been shown and described, it would be apparent to those skilled in the art that many more modifications are possible without departing from the inventive concepts herein. The invention, therefore, is not to be restricted except in the spirit of the appended claims.

What is claimed is:

1. A chair mat comprising
   a first rigid flat panel, the first flat panel having a first straight panel edge, a first chair bearing surface on one side of the first flat panel extending to the first straight panel edge and a first floor bearing surface on the other side of the first flat panel extending to the first straight panel edge;
   a second rigid flat panel, the second flat panel having a second straight panel edge, a second chair bearing surface on one side of the second flat panel extending to the second straight panel edge and a second floor bearing surface on the other side of the second flat panel extending to the second straight panel edge, the floor bearing surfaces being anti-skid and having no tensile strength across the abutting first and second straight panel edges through full movement of the first and second flat panels relative to one another;
   a non-woven flexible fabric sheet permanently adhered to and fully covering the chair bearing surfaces of the first and second flat panels with the first and second straight panel edges abutting;
   a material strip with high tensile strength filaments extending at least laterally in the material strip, the material strip extending the length of the abutting first and second straight panel edges and permanently adhered to the first and second bearing surfaces covered by the flexible fabric sheet between the flexible fabric sheet and the first and second flat panels.

2. The chair mat of claim 1, the non-woven flexible fabric sheet being no more than about 0.030" thick.

3. The chair mat of claim 1, the anti-skid floor bearing surfaces being a sheet permanently adhered to the floor bearing surfaces.

4. The chair mat of claim 3, the anti-skid floor bearing surfaces including anti-skid surface texture.

5. A chair mat comprising
   a first rigid flat panel, the first flat panel having a first straight panel edge, a first chair bearing surface on one side of the first flat panel extending to the first straight panel edge and a first floor bearing surface on the other side of the first flat panel extending to the first straight panel edge;
   a second rigid flat panel, the second flat panel having a second straight panel edge, a second chair bearing surface on one side of the second flat panel extending to the second straight panel edge and a second floor bearing surface on the other side of the second flat panel extending to the second straight panel edge, the floor bearing surfaces having no tensile strength across the abutting first and second straight panel edges through full movement of the first and second flat panels relative to one another;
   a non-woven flexible fabric sheet permanently adhered to and fully covering the chair bearing surfaces of the first and second flat panels with the first and second straight panel edges abutting;
   a material strip with high tensile strength filaments extending at least laterally in the material strip, the material strip extending along the abutting first and second straight panel edges and permanently adhered to the first and second bearing surfaces covered by the flexible fabric sheet between the flexible fabric sheet and the first and second flat panels.

* * * * *